E. R. KOCH.
CHAIN FOR AUTOMOBILE TIRES.
APPLICATION FILED AUG. 16, 1919.
1,402,364.
Patented Jan. 3, 1922.
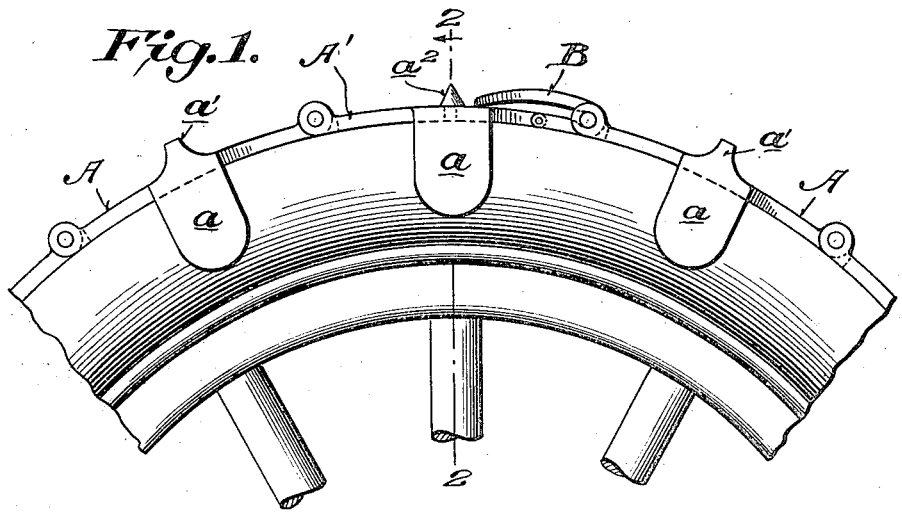
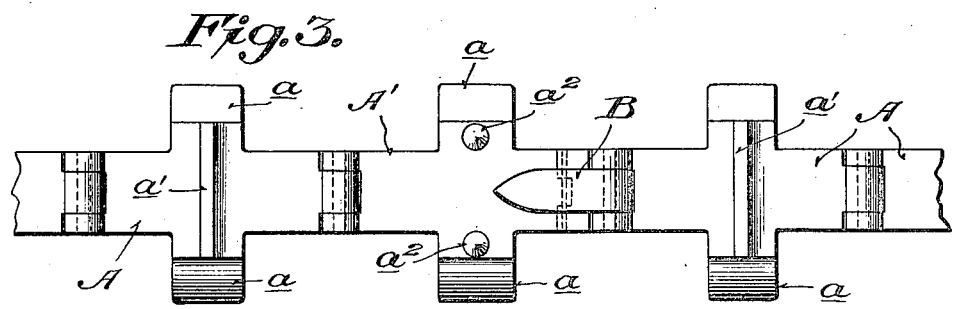
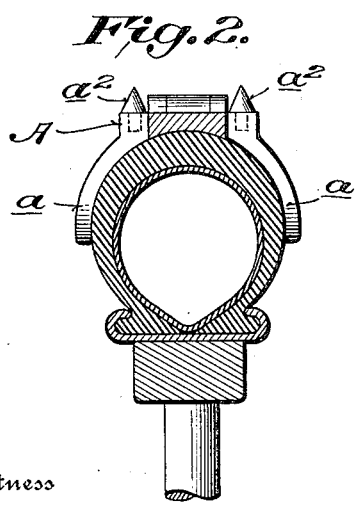
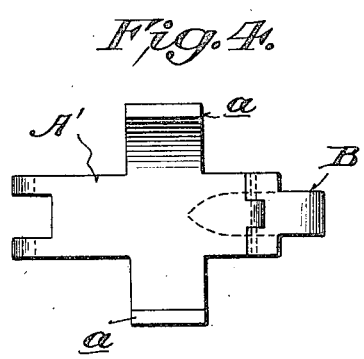

UNITED STATES PATENT OFFICE.

ERANIOUS RIHART KOCH, OF ELLWOOD CITY, PENNSYLVANIA.

CHAIN FOR AUTOMOBILE TIRES.

1,402,364.  Specification of Letters Patent.  Patented Jan. 3, 1922.

Application filed August 16, 1919. Serial No. 318,054.

*To all whom it may concern:*

Be it known that I, ERANIOUS R. KOCH, a citizen of the United States, residing at Ellwood City, in the county of Lawrence and State of Pennsylvania, have invented certain new and useful Improvements in Chains for Automobile Tires; and I do hereby declare the following to be a full, clear, and exact description of the invention, such as will enable others skilled in the art to which it appertains to make and use the same.

This invention relates to chains for automobile tires, and has for its object to provide a simple, efficient, inexpensive, strong and durable device of the character referred to that will give better traction than chains as heretofore constructed and will not injure the tire and may be easily and quickly applied to the wheel or removed therefrom and when applied will be firmly held in place and adapted to serve as an armor for a pneumatic tire as well as to prevent slipping or skidding.

The invention will first be hereinafter more particularly described, with reference to the accompanying drawings, which form a part of this specification, and then pointed out in the claims at the end of the description.

In said drawings:

Figure 1 represents a side view of a fragmentary portion of a wheel having a chain embodying my invention applied thereto;

Fig. 2 is a cross-section taken on the line 2—2 of Fig. 1;

Fig. 3 is a plan view of a series of pivotally connected links including a modified form of link at one end of the chain carrying a hook for connecting it with the other end of the chain when placed around the wheel;

Fig. 4 is a side elevation of the link with attached hook shown in Fig. 3.

Referring to said drawings, in which the same reference letters are used to denote corresponding parts in different views, the letter A may denote a chain link constructed of pressed steel or other suitable metal and having at one end an apertured lug or ear and at the other end spaced apertured lugs or ears adapted to receive therebetween the lug or ear projecting from one end of an adjacent link for pivotal connection therewith by means of a bolt or rivet passing through the apertures in said ears. Each link has formed thereon or rigidly secured thereto on the inner side thereof, flanges $a$ which diverge from the base thereof to their free ends and are shaped to conform to the contour or curvature of the tire on which they are placed, so as to straddle the tire and prevent sidewise or lateral movement of the link and thereby hold the chain on the wheel without requiring other fastening means. To insure a firm hold on the road bed and prevent slipping or skidding, the chain links are provided on their outer sides with spurs similar to the toes or calks used on horses' shoes. In the form shown toes $a^1$ alternate with calks $a^2$. But instead of alternating toes and calks, toes or calks only may be used. However, the alternating arrangement insures greater safety against skidding, and is more satisfactory than either toes or calks alone, for the reason that the toes, which extend transversely of the links, secure a broad and firm hold and prevent skidding in the direction of travel, though liable to slide in the direction of their length, while the calks, which are liable to indent or injure the road bed if used alone, may be used alternately with the toes so as to prevent the sidewise movement which the toes alone will permit, and which, because of their length, are liable to injure the road if arranged to extend lengthwise of the link, or at an angle thereto. One of the links of the series is formed or provided at one end of the chain with apertured lugs or ears at both ends and carries a hook B, whereby it may be connected with a link at the other end of the chain, when the chain is placed around the wheel, the free ends of the chain being connected together by causing said hook to take over or around a bolt or rivet which passes through the ears on one end of the link at the other end of the chain, as shown in Fig. 4. Said hook is preferably formed with a long tongue adapted to lie flatwise on the surface of the chain or connecting link to which it is attached, and effectually hold the ends of the chain together so as to prevent accidental disconnection.

It will be understood, of course, that either toes alone or calks or spurs may be used on the outer sides of the links though I preferably use toes on each alternate link and calks on the other links, so that the calks may alternate with the toes throughout the length of the chain.

Having thus described my invention, what

I claim as new and desire to secure by Letters Patent of the United States, is:—

1. A non-skid chain for automobile tires comprising a series of links hinged together end to end and having about midway thereof on opposite sides outwardly and inwardly extending divergent flanges which are curved to conform to the curvature of the tire and adapt them to partially embrace the tire and hold the chain thereon without other fastening means, and coöperating means on said links to prevent sliding either sidewise or in the direction of their length; said means comprising toes on alternate links extending transversely thereof and calks on the other links alternating with said toes, substantially as described.

2. A chain for vehicle wheels comprising a series of links provided on the outer sides thereof with spurs to prevent skidding and having on their inner sides inwardly extending flanges shaped to conform to the contour of the tire and to partially embrace the same and hold the chain thereon against sidewise movement, said links having apertured lugs or ears on their ends to receive fastening bolts for pivotally connecting them together, and the link at one end of the chain carrying a hook for connecting it with the link at the other end of the chain.

In testimony whereof I affix my signature in the presence of two witnesses.

ERANIOUS RIHART KOCH.

Witnesses:
   Jos. W. Humphrey,
   Verda I. Sutton.